(12) United States Patent
Diepstraten et al.

(10) Patent No.: US 7,289,578 B2
(45) Date of Patent: Oct. 30, 2007

(54) WIRELESS LOCAL AREA NETWORK APPARATUS

(75) Inventors: Wilhelmus J. M. Diepstraten, Diessen (NL); Hendrik van Bokhorst, Nijkerk (NL); Hans van Driest, Bilthoven (NL)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 11/331,919

(22) Filed: Jan. 13, 2006

(65) Prior Publication Data

US 2006/0121861 A1 Jun. 8, 2006

Related U.S. Application Data

(60) Continuation of application No. 10/681,267, filed on Oct. 9, 2003, now Pat. No. 7,010,058, which is a division of application No. 10/092,295, filed on Mar. 7, 2002, now Pat. No. 6,707,867, which is a continuation of application No. 08/155,661, filed on Nov. 22, 1993, now abandoned.

(30) Foreign Application Priority Data

Mar. 6, 1993 (GB) ................................ 9304622.5

(51) Int. Cl.
*H04L 27/00* (2006.01)
*H04L 7/00* (2006.01)
*H04B 1/16* (2006.01)

(52) U.S. Cl. ...................... 375/316; 375/354; 455/343
(58) Field of Classification Search ............... 375/354, 375/316, 362–366, 340; 455/334, 343; 370/503–514
See application file for complete search history.

(56) References Cited

U.S. PATENT DOCUMENTS

| | | | | |
|---|---|---|---|---|
| 4,403,212 A | 9/1983 | Masaki | ...................... | 340/7.51 |
| 4,449,249 A | 5/1984 | Price | .......................... | 455/38.3 |
| 4,569,042 A | 2/1986 | Larson | ...................... | 370/250 |
| 4,631,496 A | 12/1986 | Borras | ......................... | 331/1 A |
| 4,731,768 A | 3/1988 | Easterday | ................... | 368/118 |
| 4,745,408 A | 5/1988 | Nagata | ...................... | 340/7.36 |
| 4,897,835 A | 1/1990 | Gaskill | ....................... | 370/314 |
| 4,920,534 A | 4/1990 | Adelmann et al. | .......... | 370/474 |

(Continued)

FOREIGN PATENT DOCUMENTS

EP 0452124 10/1991

(Continued)

*Primary Examiner*—Tesfaldet Bocure

(57) ABSTRACT

A wireless local area network apparatus includes a transmitter and a receiver in which operation of the receiver is accurately synchronized with periodic signals from the transmitter. The periodic signals contain timing data indicating the state of a timer in the transmitter at the time the signal containing that data was transmitted and this timing data is retrieved from the signal when received by the receiver and loaded in a timer for controlling operation of the receiver.

99 Claims, 4 Drawing Sheets

U.S. PATENT DOCUMENTS

| | | | |
|---|---|---|---|
| 5,052,029 A | 9/1991 | James et al. | 375/356 |
| 5,150,361 A | 9/1992 | Wieczorek | 370/311 |
| 5,187,471 A | 2/1993 | Wagai | 340/7.38 |
| 5,230,084 A | 7/1993 | Nguyen | 340/7.34 |
| 5,251,325 A | 10/1993 | Davis et al. | 340/7.38 |
| 5,252,963 A | 10/1993 | Snowden et al. | 340/7.38 |
| 5,255,291 A | 10/1993 | Holden et al. | 375/362 |
| 5,263,195 A | 11/1993 | Panther et al. | 455/316 |
| 5,278,892 A | 1/1994 | Bolliger | 455/442 |
| 5,280,629 A | 1/1994 | Lo Galbo et al. | 455/503 |
| 5,305,308 A | 4/1994 | English | 370/335 |
| 5,371,733 A | 12/1994 | Denneau et al. | 370/241 |
| 5,392,457 A | 2/1995 | Davis et al. | 340/7.38 |
| 5,485,632 A | 1/1996 | Ng et al. | 455/503 |
| 5,495,482 A | 2/1996 | White et al. | 370/419 |
| 5,530,915 A | 6/1996 | Shaughnessy et al. | 455/503 |
| 5,537,407 A | 7/1996 | Park et al. | 370/314 |
| 5,696,437 A | 12/1997 | Panther et al. | 340/636.11 |
| 6,167,268 A * | 12/2000 | Souissi et al. | 455/434 |
| 6,707,867 B2 | 3/2004 | Diepstraten et al. | 375/354 |

FOREIGN PATENT DOCUMENTS

WO 9107030 5/1991

* cited by examiner

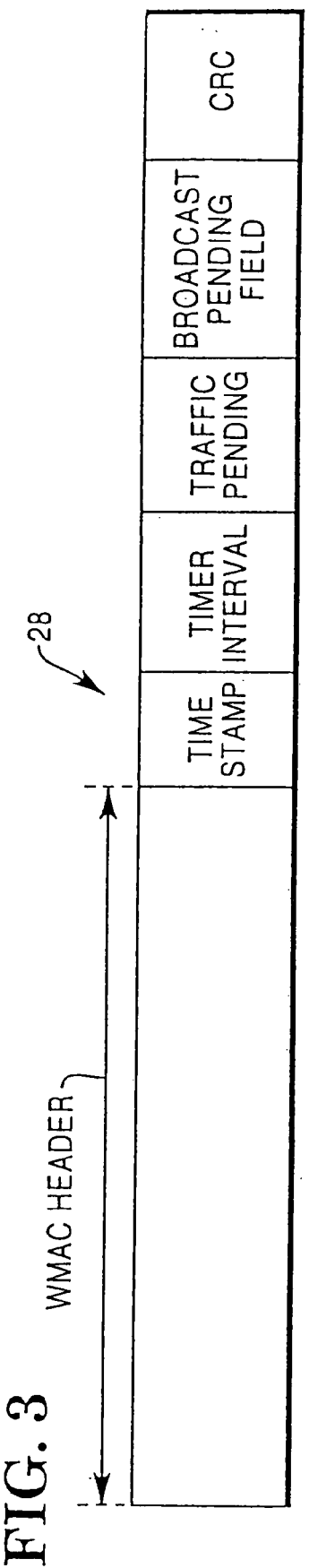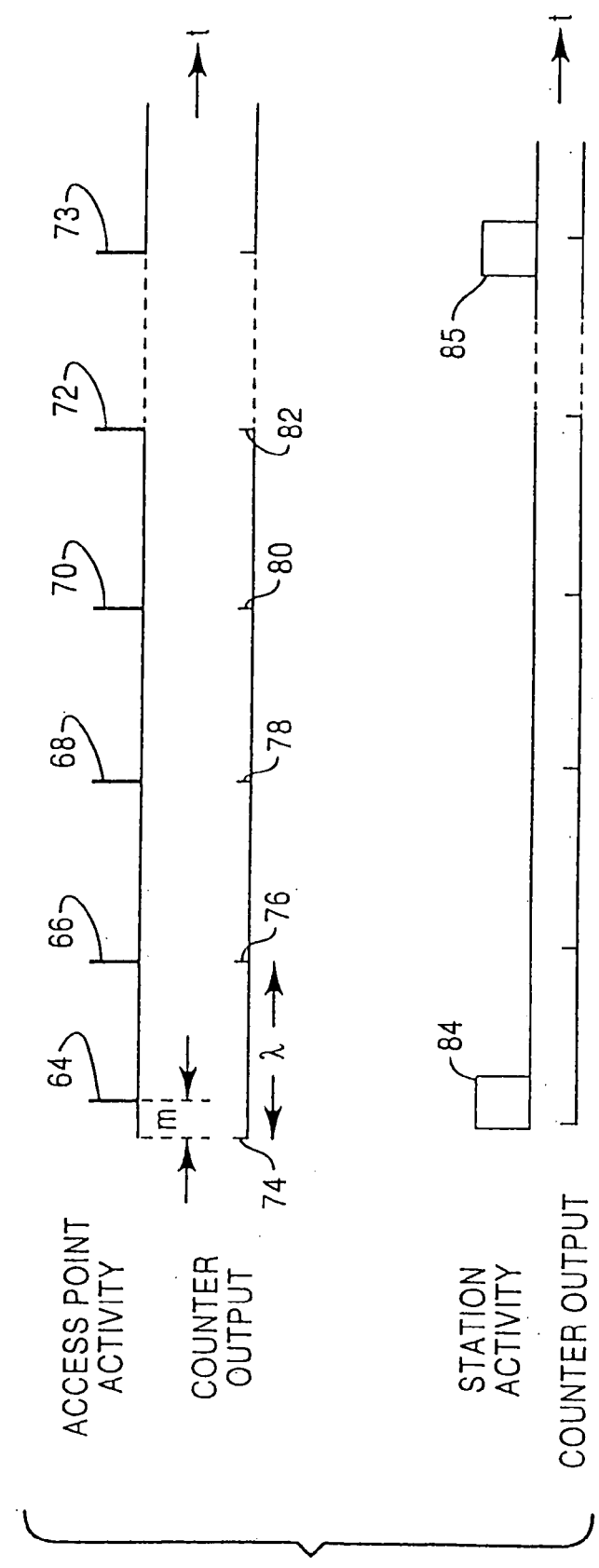
FIG. 3
FIG. 7

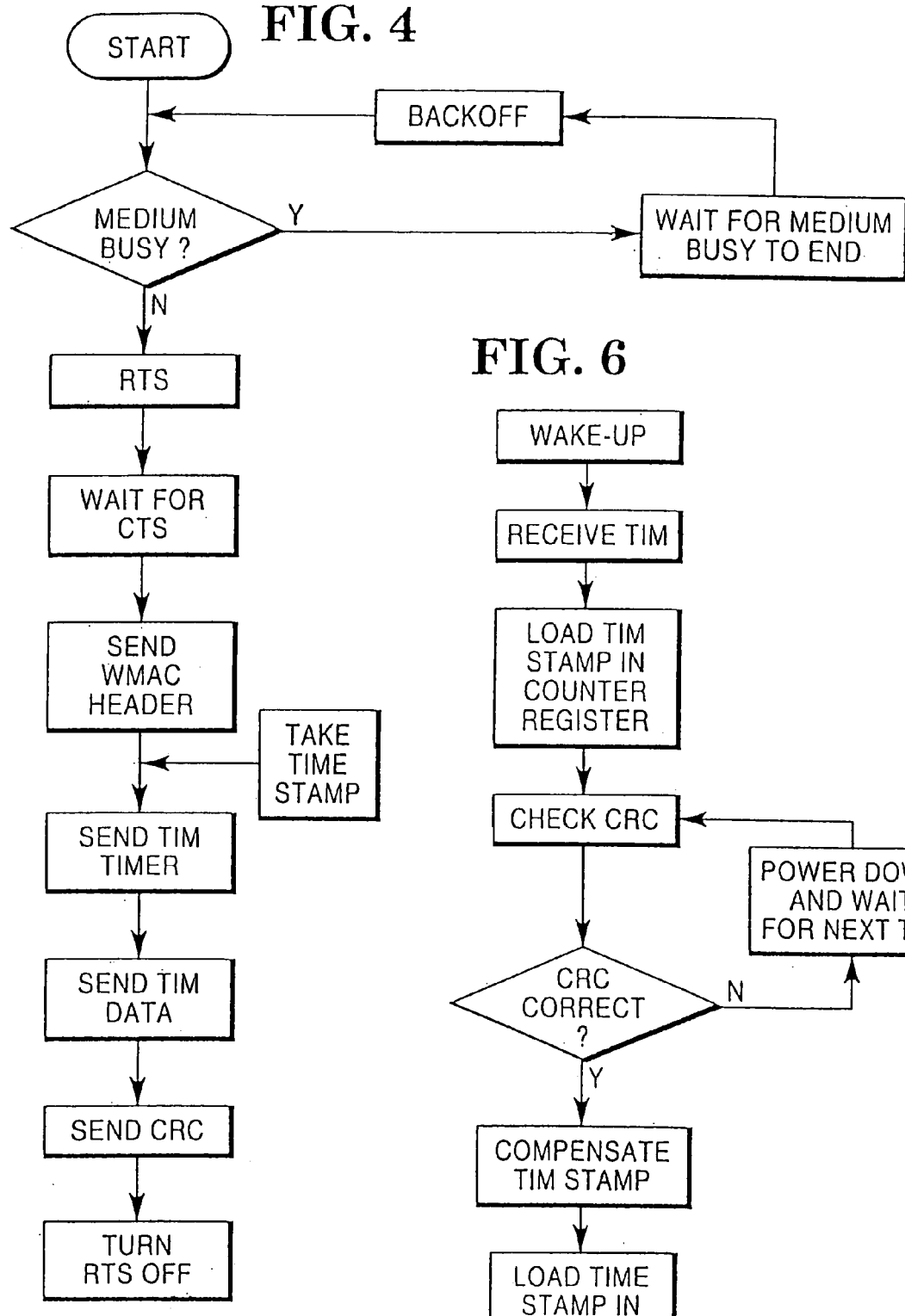

WIRELESS LOCAL AREA NETWORK APPARATUS

CROSS-REFERENCE TO RELATED APPLICATIONS

This is a continuation of application Ser. No. 10/681,267, filed on Oct. 9, 2003 now issued as U.S. Pat. No. 7,010,058 on Mar. 7, 2006, which is a divisional of application Ser. No. 10/092,295, filed on Mar. 7, 2002 and issued on Mar. 16, 2004 as U.S. Pat. No. 6,707,867, which is a continuation of application Ser. No. 08/155,661, filed on Nov. 22, 1993 and now abandoned, which claimed foreign priority from British patent application 9304622.5, filed on Mar. 6, 1993.

BACKGROUND OF THE INVENTION

1. Field of the Invention

The present invention relates to wireless local area network apparatus.

2. Description of the Related Art

A wireless local area network commonly comprises a plurality of communication stations located in a Basic Service Area (BSA). The stations can send and receive communication signals via a base station and, in this manner, the base station receives the signals from a station in the BSA and re-transmits the signals to the intended recipient station.

The BSA can be provided as one of a plurality of BSAs which together form an Extended Service Area. In this case, the base station of each BSA may comprise an access point for a backbone infrastructure for connecting the BSAs for allowing communication between stations in different BSAs within the Extended Service Area.

Communication between stations, whether by way of a base station or otherwise, can require synchronization between a transmitter of one station or an access point and a receiver of another station. Disadvantageously, accurate synchronization between a transmitter and a receiver in a BSA cannot be readily achieved due, in particular, to operational limitations such as transmission and reception delays and delays in accessing the wireless medium.

SUMMARY OF THE INVENTION

It is an object of the present invention to provide wireless local area network apparatus having improved synchronization between the transmitters and the receivers in the network.

According to certain embodiments of the present invention, there is provided wireless local area network apparatus comprising transmitter means and receiver means, characterized in that said transmitter means includes transmitter timer means for controlling periodic generation of transmission signals, said receiver means includes receiver timer means, and said transmitter means has means for including transmitter timer data in said signals for synchronizing said receiver timer means with said transmitter timer means, said transmitter timer data representing the state of said transmitter timer means at the time of transmission of the signal in which it is included.

The wireless local area network apparatus of certain embodiments of the present invention is particularly advantageous for power management applications in which low power portable wireless stations are employed in the BSA. The stations periodically switch between a low power consumption state, in which their transceivers are de-energized, and a high power consumption state, in which their transceivers are energized, and can thereby receive periodic signals transmitted from some other station. The synchronization between the signals transmitted from some other station and the switching of the power-consumption state of the receiver stations is advantageously achieved by the apparatus of the present invention. The improved synchronization of the present invention allows for operation of the stations in a wireless local area network with reduced power-consumption, which is particularly important for stations having an on-board power supply.

The apparatus of certain embodiments of the present invention can be advantageously employed to control other timing relationships between a transmitter and a receiver in a wireless local area network. For example, in so-called frequency-hopping devices, the transmission frequency employed by a transmitter is periodically changed and so a receiver has to adapt to this change in communication-signal frequency. The apparatus of certain embodiments of the present invention allows for accurate synchronization between the operational changes in the transmitter and receiver during such frequency hopping.

In one embodiment, the present invention is a receiver for a wireless local area network (WLAN). The receiver comprises a radio modem adapted to receive, from a transmitter of the WLAN, a transmission signal containing a time stamp value; a first register adapted to receive the transmission signal from which the time stamp value is retrieved; a timer adapted to initiate a count sequence based on the time stamp value and generate a timer control signal at the completion of the count sequence; and a controller adapted to control operations of the receiver based on the timer control signal from the timer.

In another embodiment, the present invention is a method for a receiver in a WLAN. A transmission signal containing a time stamp value is received from a transmitter of the WLAN. The time stamp value is retrieved from the transmission signal, and a count sequence is initiated based on the time stamp value. A timer control signal is generated at the completion of the count sequence, and operations of the receiver are controlled based on the timer control signal.

BRIEF DESCRIPTION OF THE DRAWINGS

One embodiment of the invention is described further hereinafter, with reference to the accompanying drawings in which:

FIG. 3 shows the structure of a Traffic Indication Message constructed in the transmitter of FIG. 2;

FIG. 4 is a flow diagram of the operation of the transmitter of FIG. 2;

FIG. 6 is a flow diagram of the operation of the receiver of FIG. 5; and

FIG. 7 is a timing diagram illustrating operation of the transmitter of FIG. 2 and the receiver of FIG. 5.

DETAILED DESCRIPTION OF THE PREFERRED EMBODIMENT

Figure 1:
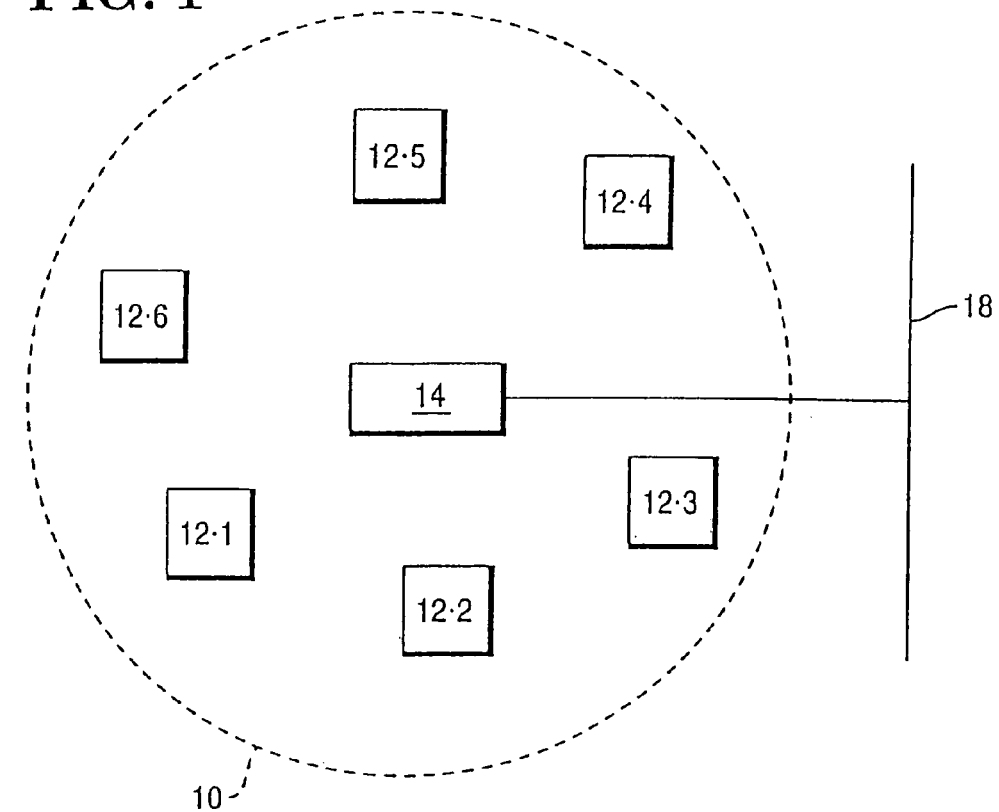
FIG. 1 shows a wireless local area network which forms part of an extended service area.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the intention is to cover all modifications, equivalents, and alternatives falling within the spirit and scope of the invention as defined by the appended claims.

As mentioned above, the apparatus of the present invention can be used in a power management system for a wireless local area network.

Such a local area network is shown in FIG. 1 and comprises a basic service area (BSA) 10 having six mobile stations 12.1–12.6 located therein. In the illustrated embodiment each of the stations 12.1–12.6 is powered by an on-board d.c. supply (not shown) although some of the stations could be supplied by connection to an a.c. source. An access point 14 is also located in the BSA 10 and is typically connected to an a.c. power supply (not shown) and is connected to a backbone structure 18 linking the access point 14 to access points of other BSAs (not shown). The stations 12.1–12.6 communicate with each other via the access point 14. Thus, a communication signal from one station 12.1 to another station 12.2 will not be received directly by the station 12.2 but will first be received by the access point 14 and then transmitted to the station 12.2.

In order to reduce the power consumption of the stations 12.1–12.6, and thereby increase the operational life-time before the on-board d.c. power supply needs to be recharged or replaced, the stations 12.1–12.6 are operated in a power-save-mode in which their transceivers are periodically de-energized and the station is then in a so-called doze state. In order to operate the station 12.1–12.6 in a power-save-mode without losing any transmitted data packets, a data packet that is intended for a station that is in a doze state is buffered in the access point 14 until such time as the station wakes-up from its doze state into a so-called awake state and energizes its transceiver to receive the buffered data.

Traffic Indication Message (TIM) packets are transmitted at regular intervals from the access point 14 and indicate for which stations 12.1–12.6 in the BSA 10 data packets are buffered in the access point 14. The transceivers in the stations 12.1–12.6 are periodically energized at regular intervals such that the stations 12.1–12.6 wake up from a doze state to receive the TIM packets transmitted by the access point 14. If a TIM packet received indicates that a data packet is buffered in the access point 14 for one of the stations 12.1–12.6, the transceiver of that station either waits to receive the data packet which is arranged to automatically follow the TIM packet, or the station transmits a poll packet to the access point 14 to request that the data packet be transmitted. In both of the above situations, the transceiver in the station remains in an energized state once it has received a TIM packet indicating that data is buffered for that station. Once the data packet has been received, the station returns to a doze state until it awakes to receive another TIM packet.

Accordingly, with the exception of the periodic waking to receive the TIM packets, a station 12.1–12.6 remains in a power saving doze state unless a TIM packet indicates a data packet is buffered for that station. In this manner, the power consumption of each station 12.1–12.6 is reduced and the operational life-time, i.e. the time before recharging or replacement of the d.c. power source is necessary, of the station is increased. The improved synchronization provided by the present invention provides for improved synchronization between the access point 14 and the stations 12.1–12.6 operating in a power-save mode so as to achieve advantageously reduced power consumption in the stations 12.1–12.6.

Further power consumption reductions can be achieved by operation of the stations 12.1–12.6 in a so-called extended-power-save mode. The improved synchronization provided by the present invention advantageously supports operation of the stations 12.1–12.6 in the extended-power-save mode. In this mode, the station is controlled to wake up from a doze state to receive only every xth TIM packet transmitted by the access point 14. For example, if x=150 then the station awakes to receive only every 150th TIM packet transmitted by the access point 14 and so the station remains in a doze state for a longer period than if it wakes to receive every TIM packet transmitted by the access point 14. Power consumption in the station is thereby further reduced. Since, in the above example, a station awakes only every 150 TIM packets, accurate synchronization between the access point 14 and the station is required so that the station wakes up at an appropriate time to receive every 150th TIM packet. The present invention provides for such accurate synchronization.

It should be noted that although the access point 14 may have a data packet buffered therein to transmit to a station operating in an extended-power-save mode, the data packet remains buffered in the access point 14 until the station 12 wakes up upon receipt of the xth TIM packet after which the station will poll the access point 14 to transmit the buffered packet and so data is not lost.

The energization of the transceivers in the stations 12.1–12.6 and in the access point 14 can be controlled by timers which include crystal oscillators. Synchronization between the timers in the stations 12.1–12.6 and the access point 14 is achieved by apparatus embodying the present invention and an indication of the reduced power consumption of a station having such a timer and operating in an extended-power-save mode is given below in which:

The time interval between successive TIM packets transmitted from the access point 14 is 200 msec; the station's transceiver has a power-up delay of 1 msec; the timing drift of the oscillator in the station is 100 micro sec/sec; the timing drift of the oscillator in the access point 14 is 100 micro sec/sec; the TIM packet medium access delay is between 0 and 5 msec; and the station is required to wake up to receive every 150th TIM packet from the access point 14.

Using the above values as examples:

The station doze interval=150×200 msec=30 sec

The maximum drive of each oscillator in the doze interval=100 micro sec/sec×30=3 msec The maximum drift for both oscillators therefore=6 msec Thus, in view of the station's 1 msec power-up delay, the station should wake up 7 msec before the expected TIM packet to compensate for the oscillator drift and the power-up delay.

With a TIM access delay of 5 msec as an example, the period during which the station is in an awake state to receive a TIM packet is between 1 msec (when there is no crystal drift and the TIM access delay is 0 msec) and 1 msec+6 msec+5 msec=12 msec (when the total crystal drift is experienced and the TIM interval delay is 5 msec).

Assuming that the TIM packet has a duration of 0.5 msec, the average duration of the awake state of the station is 1+6/2+5/2+0.5=7 msec.

Thus, in this example, the station will be in an awake state, i.e., with its transceiver energized, for, on average, only 7 msec every 30 sec which provides for a particularly advantageous power consumption reduction.

By way of comparison, and assuming the same values as above, if the station wakes-up at every TIM, thereby requiring an average "on-time" of 1+5/2=3.5 msec per 200 msec TIM interval, the station is then awake for 525 msec every 30 sec.

Figure 2:
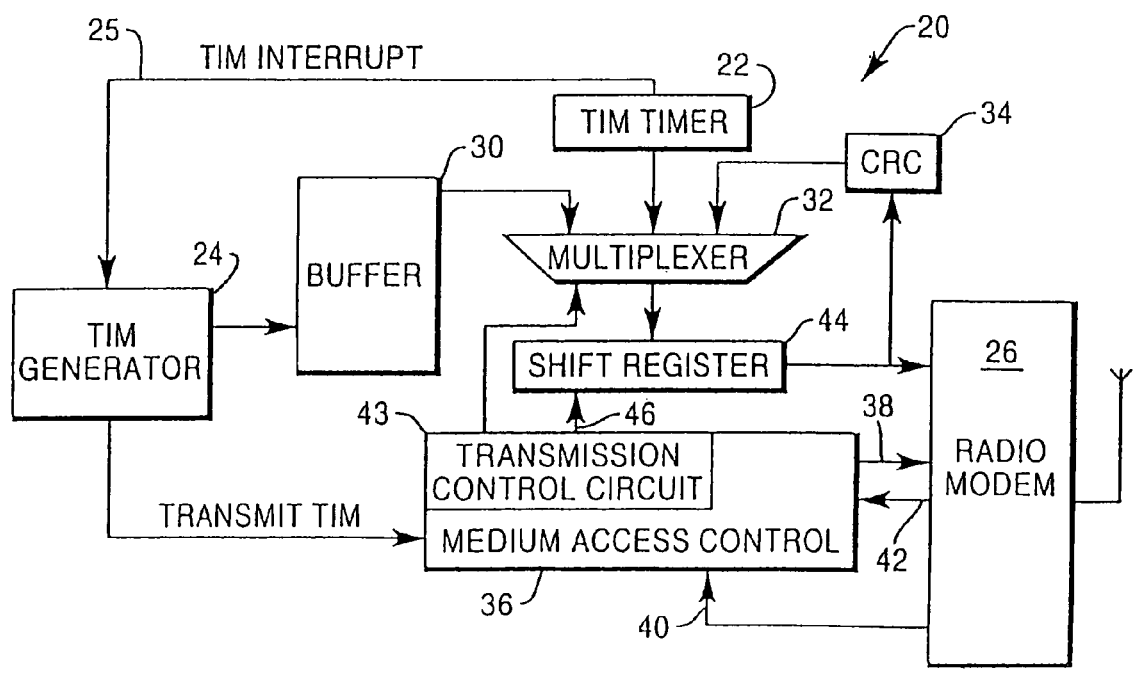
FIG. 2 is a block diagram of a transmitter for use in apparatus embodying the present invention.

FIG. 2 illustrates a transmitter 20 for use in the access point 14. The transmitter 20 includes a modulo n counter 22 which, in operation, is free running and synchronized with a similar modulo n counter 58 in a station's receiver (see FIG. 5).

The modulo n counter 22 functions as a timer and when the count value reaches n, a TIM function generator 24 is triggered by way of an interrupt signal 25 indicating that the next TIM packet should be constructed, and transmitted by way of a radio modem 26.

The TIM packet 28 is constructed in a transmitter buffer 30 and an example of a TIM packet is illustrated in FIG. 3. The TIM packet comprises a wireless medium access (WMAC) header and a data field format. The WMAC header includes, amongst other fields, a Type field that identifies the packet as a TIM packet.

The data field format includes:
A TIME STAMP FIELD in which is loaded a so-called time stamp of the value of the modulo n counter in the transmitter 20 at the time of transmission of the TIM;
A TIMER INTERVAL FIELD which indicates the value of n of the modulo n counter in the transmitter 20;
A TRAFFIC PENDING FIELD which indicates for which stations data packets are buffered; and
A TRAFFIC BROADCAST PENDING FIELD which indicates the number of outstanding broadcast data packets buffered for the stations.

Referring again to FIG. 2, once the TIM packet 28 has been constructed, it is delivered to a multiplexer 32 where the time stamp, and cyclic redundancy check (CRC) data from a CRC generator 34, are loaded into the TIM packet 28. A WMAC control 36 controls access to the medium via the modem 26 so that the TIM packet 28 is not transmitted from the access point 14 immediately upon generation of the interrupt signal 25. The WMAC control 36 follows a medium access protocol such as Carrier Sense Multiple Access with Collision Avoidance (CSMA/CA). According to the CSMA/CA protocol, the energy level on the wireless medium is sensed by the modem 26 to determine if there is any existing network activity, and if the sensed energy level is above a threshold value, a medium busy signal 40 is delivered from the modem 26 to the WMAC Control 36. If no medium busy is issued, so the medium is sensed "free," the WMAC control 36 turns on the transmitter of the modem 26 by issuing a request to send (RTS) signal. The modem 26 will then start to send a training sequence and will issue a clear-to-send signal (CTS) once the training sequence is complete. The modem 26 then sends the serialized data that arrives from the buffer via the multiplexer 32 and a shift register 44. If the medium is sensed as "busy," the WMAC control 36 waits until the medium becomes free and then generates a random backoff delay after which the medium is again sensed. If the medium is sensed as "free" at this point then the control 36 follows the RTS, CTS procedure above.

When accessing the medium and once the training sequence has ended, the modem 26 provides the CTS 42 and the TIM packet stored in the buffer 30 is loaded into the shift register 44 via the multiplexer 32. Once transmission of the header has started, the time stamp is loaded from the timer 22 into the shift register 44 via the multiplexer 32 and under the control of a transmit control circuit 43 in the WMAC control 36. The transmit control circuit 43 also controls the start of the transmission of the header. As mentioned above, the modulo n counter 22 in the access point 14 of transmitter 20 is free running and so by the time the CSMA/CA protocol has been completed, and particularly if a medium busy signal 40 was received by the WMAC control 36, the counter 22 is already into its next count sequence, i.e. at a value between 0 and n, by the time that the clear-to-send signal 42 is received by the WMAC control 36. At a predetermined time relative to the clear-to-send signal 42, which predetermined time is an accurate estimation of the exact time at which the TIM packet will be transmitted having regard to delays in the modem 26, the so-called "time stamp" i.e. the value of the modulo n counter 22 at that predetermined time, will be loaded in the TIM packet 28 stored in the buffer 30. The TIM packet 28 is loaded into a shift register 44 upon generation of a load signal 46 from the WMAC control 36, and then transmitted by way of the modem 26.

FIG. 4 further illustrates the operation of the transmitter 20 outlined above.

Figure 5:
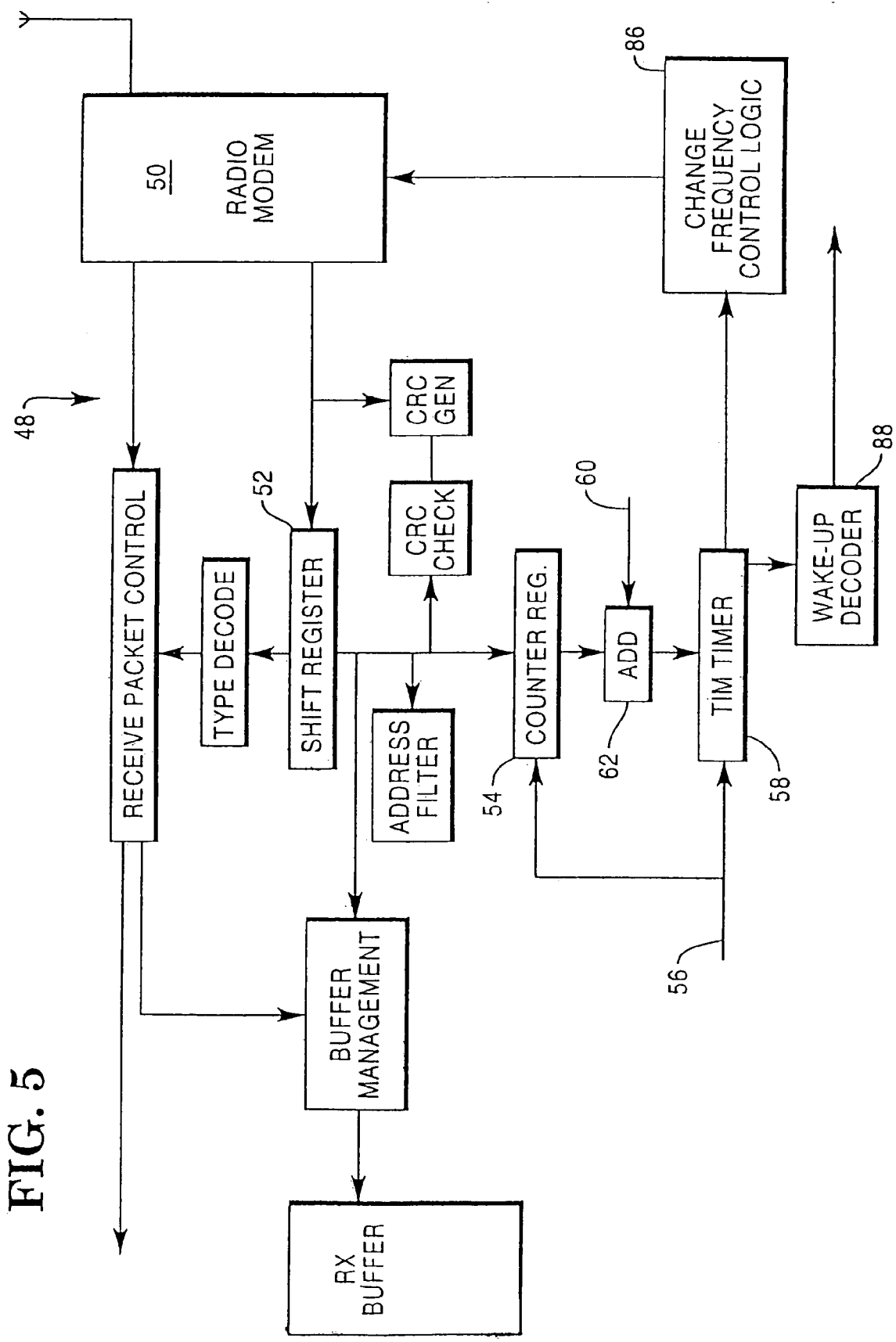
FIG. 5 is a block diagram of a receiver for use in apparatus embodying the present invention.

FIG. 5 illustrates a receiver 48 of one of the stations 12.1–12.6 in the BSA which is arranged to receive a TIM packet 28 and a data packet (not shown) from the access point 14.

The operation of the receiver 48 is outlined below and further illustrated in FIG. 6.

Energization of the receiver 48 is controlled by a modulo n counter 58 which functions as a timer to wake up the station 12.1 from a doze state to receive the TIM packet 28 transmitted from the access point 14.

The TIM packet 28 is received by a receiver modem 50 and its time stamp value retrieved from the TIM TIME STAMP FIELD (FIG. 3). The retrieved time stamp is delivered by way of a shift register 52 to a counter register 54 which commences a modulo n count starting from the point between 0 and n which corresponds to the time stamp value. The counter register 54 continues its modulo n count with the same clock signal 56 that controls the modulo n counter 58. This modulo n count is stored in the counter register 54 until the TIM packet 28 is completely received and the CRC data checked. If the CRC is correct, the modulo n count is loaded from the counter register 54 into the modulo n counter 58. The use of the counter register 54 is particularly advantageous in that it allows TIM packets of different lengths to be received. This arises since the modulo n count sequence, that commences at the time stamp value, is buffered in the register 54 while the TIM packet 28 is processed completely. The counter register 54 maintains the cyclic modulo n count for as long as is necessary to process the TIM packet.

If all the TIM packets are of the same known length, then a TIM-packet-processing compensation factor could be applied to the time stamp value to allow for the known time taken to process the TIM packet of known length. The compensated time stamp value would then be loaded directly into the modulo n counter 58 and so the intermediate counter register 54 would not be required.

Referring again to the embodiment illustrated in FIG. 5, a delay compensation value 60 is added to the modulo n count by an adder 62 as the count is transferred from the counter register 54 to the modulo n counter 58. The compensation value 60 compensates for the propagation delay of the receiver 48 and the transmitter 20. Once the compensated modulo n counter value is transferred from the counter register 54 to the counter 58, the counter 58 is then accurately synchronized with the modulo n counter 22 in the transmitter (FIG. 2).

Once the modulo n counters 22, 58 in the station 12.1 and the access point 14 are accurately synchronized, the counter 58 provides the station 12.1 with an accurate indication of the time at which the counter 22 in the access point 14 reaches its n value and generates a TIM packet for transmission. Since the counter 22 in the access point 14 remains free-running, and the counter 58 in the station 12.1 is accurately synchronized with the counter 22, the station 12.1 can be controlled to accurately wake up in time to receive only every xth TIM packet without requiring the station 12.1 to wake up unnecessarily early as would be required to assure receipt of the TIM packet if accurate synchronization between the counters 22, 58 was not available. The reduction in the need for early wake up of the station 12.1 advantageously reduces the power consumption of the station 12.1.

It should be noted that each station 12.1–12.6 in the BSA 10 can operate with different doze intervals. For example one of the stations 12.1 can be controlled to wake up every 150 TIM packets while another station 12.2 wakes up every 200 TIM packets. Each time the station 12.1 wakes up to receive a TIM packet, the modulo n counter 58 is reset by the time stamp retrieved from the TIM packet so that continued accurate synchronization can be achieved.

FIG. 7 is a timing diagram that further illustrates the improved synchronization of the present invention as provided in a power management application. The access point 14 activity indicates the transmission of the first five TIM packets 64–72, and the last TIM packet 73, of a one hundred and fifty TIM packet series and the first five TIM generation signals 74–82 generated each time the modulo n counter 22 in the access point 14 reaches its value n. As shown, the transmission of the first TIM packet 64 is delayed due to a medium busy signal obtained from the CSMA/CA protocol. The first TIM packet 64 is therefore actually transmitted m counts of modulo n counter 22 into the first count sequence 74–76. The station 12.1 has previously been synchronized to wake up at 84 to receive the first TIM packet 64. The TIM packet 64 carries a time stamp value m representing the value of the modulo n counter 22 in the access point 14 at the actual time of transmission of the TIM packet 64. As described above, the station 12.1 retrieves the time stamp from the TIM packet 64 and loads it into its own modulo n counter 58 which then commences its count sequence at value m. As shown in FIG. 7, the two modulo n counters 22, 58 remain in syncnronization as they cyclically count up to value n. This synchronization readily allows the station 12.1 to remain in a doze state until its modulo n counter 58 indicates that the 150th TIM packet 73 is to be generated in, and transmitted from, the access point 14, and the station 12.1 wakes up at 85. Only a minor amount of compensation is necessary to allow for the possible modem delay of the transmitter 20 and receiver 48.

If a time stamp value of the access point counter 22 is not taken and instead the station counter 58 is reset to 0 by the actual receipt of the TIM packet 64, the late arrival of the TIM packet 64 due to the CSMA/CA delay leads to unsynchronized operation of the counters 22, 58 because when the access point counter 22 has reached a value m, the station counter 58 is being reset to 0 by receipt of the TIM PACKET 64. The station counter 58 has therefore just recorded a TIM interval of n+m counts and if the station is then controlled to remain in a doze state until 150 TIM packets have been transmitted, i.e. until after 150 TIM intervals, the station erroneously dozes for 150×(m+n) intervals instead of 150×n intervals and further power consuming compensatory steps are necessary which disadvantageously reduces the power saved by energizing the station receiver only every 150 TIM packets.

Thus, by including a time stamp representing the state of the access point counter 22 at the exact time of transmission of the TIM packet, the power saving benefit of energizing the station only every 150 TIM packets can be increased.

The above describes a preferred embodiment of the integration of the synchronization function in the medium-access-control function. Other forms, in which the reference point in time, where the "time stamp" is sampled, is available to both the transmitter and the receiver, can utilize the start of the frame or the actual location of the time stamp field.

The invention is not restricted to the details of the foregoing power-management embodiment. For example, the apparatus of the present invention can be employed to provide synchronization of frequency channel selection in frequency-hopping devices. In such devices the base station, for example the access point, switches communication operating frequency at a precise moment, and it is required that the other stations in the network are synchronized so as to switch their operating frequency to the new frequency at that moment. In accordance with a further advantage provided by the invention, the access point does not need to transmit a separate frequency-hop signal each time the communication operating frequency is required to change but can include a timing signal for two or more successive frequency-hops which can therefore be delivered to the stations at intervals that are longer than the intervals between the required frequency-hops. Accordingly, the stations can operate in an extended-sleep-mode wherein each xth TIM packet that is received also includes timing information indicating when the station should switch its communication operating frequency. Thus, providing frequency change logic (86 in FIG. 5) remains operational during the extended sleep period, the required frequency hop, or hops, can occur during the sleep period so that when the station next wakes up, it is still operating with the same communication frequency as the access point. Advantageously, the synchronized timing control of a frequency hopping device can be combined with the power management function of such a device so that the frequency-change logic 86 and a station wake-up control 88 are controlled by the same timing source 58.

We claim:

1. A receiver for a wireless local area network (WLAN), the receiver comprising:
   a radio modem adapted to receive, from a transmitter of the WLAN, a transmission signal containing a time stamp value, wherein the time stamp value takes into account delay at the transmitter;
   a first register adapted to receive the transmission signal from which the time stamp value is retrieved;
   a timer adapted to initiate a count sequence based on the time stamp value and generate a timer control signal based on the count sequence; and
   a controller adapted to control operations of the receiver based on the timer control signal from the timer.

2. The invention of claim 1, wherein the controller is adapted to control timing of energizing of the radio modem based on the timer control signal to enable the radio modem to receive a subsequent transmission signal from the transmitter.

3. The invention of claim 2, wherein the energizing of the radio modem corresponds to a transition from a doze state to an awake state.

4. The invention of claim 1, wherein the controller is adapted to control frequency hopping by the radio modem based on the timer control signal to adjust frequency tuning of the radio modem for receipt of a subsequent transmission signal from the transmitter.

5. The invention of claim 4, wherein the controller is adapted to control timing of energizing of the radio modem based on the timer control signal to enable the radio modem to receive the subsequent transmission signal from the transmitter.

6. The invention of claim 5, wherein the controller is adapted to implement multiple frequency hops while the radio modem is de-energized prior to receipt of the subsequent transmission signal.

7. The invention of claim 1, wherein:
the count sequence is based on a timer interval value; and
the timer is adapted to initiate the count sequence based on the time stamp value such that the duration of the count sequence corresponds to a difference between the timer interval value and the time stamp value.

8. The invention of claim 7, wherein the timer is adapted to increment a counter from the time stamp value to the timer interval value during the count sequence.

9. The invention of claim 7, wherein:
the timer interval value is explicitly encoded into the transmission signal; and
the receiver is adapted to retrieve the timer interval value from the transmission signal and apply the timer interval value in the timer.

10. The invention of claim 9, wherein the explicit encoding of the timer interval value into the transmission signal enables the receiver to implement different count sequences having different timer interval values.

11. The invention of claim 1, wherein the time stamp value corresponds to a delay in the transmission of the transmission signal from the transmitter, the delay resulting from a collision avoidance protocol implemented by the transmitter.

12. The invention of claim 1, wherein the receiver further comprises a second register connected between the first register and the timer and adapted to store the time stamp value until receipt of the transmission signal is complete.

13. The invention of claim 12, wherein the second register enables the receiver to receive transmissions signals having different sizes.

14. The invention of claim 12, wherein the receiver further comprises a checker adapted to verify whether the receiver should continue to process the transmission signal, such that the time stamp value is provided to the timer from the second register after the checker verifies that the receiver should continue to process the transmission signal.

15. The invention of claim 14, wherein:
a check value is explicitly coded into the transmission signal;
the receiver is adapted to retrieve the check value from the transmission signal; and
the checker is adapted to perform its verification processing based on the retrieved check value.

16. The invention of claim 1, wherein the receiver further comprises an adder adapted to adjust the time stamp value by a specified offset value prior to application of the adjusted time stamp value to the timer.

17. The invention of claim 16, wherein the receiver is adapted to apply the specified offset value to compensate for propagation delay of the receiver.

18. The invention of claim 17, wherein the receiver is adapted to apply the specified offset value to compensate for propagation delay of the transmitter and the receiver.

19. The invention of claim 1, wherein initiating the count sequence based on the time stamp value synchronizes the timer with a corresponding timer in the transmitter.

20. The invention of claim 19, wherein the transmitter timer is a free-running timer.

21. The invention of claim 1, wherein the timer comprises a modulo n counter.

22. The invention of claim 1, wherein the transmission signal is a TIM (Traffic Indication Message) packet.

23. The invention of claim 1, wherein the receiver further comprises:
a second register connected between the first register and the timer and adapted to store the time stamp value until receipt of the transmission signal is complete, wherein the second register enables the receiver to receive transmissions signals having different sizes;
a checker adapted to verify whether the receiver should continue to process the transmission signal, such that the time stamp value is provided to the timer from the second register after the checker verifies that the receiver should continue to process the transmission signal, wherein:
a check value is explicitly coded into the transmission signal;
the receiver is adapted to retrieve the check value from the transmission signal; and
the checker is adapted to perform its verification processing based on the retrieved check value; and
an adder adapted to adjust the time stamp value by a specified offset value prior to application of the adjusted time stamp value to the timer, wherein the receiver is adapted to apply the specified offset value to compensate for propagation delay between the transmitter and the receiver, wherein:
the transmission signal is a TIM packet;
the time stamp value corresponds to a delay in the transmission of the transmission signal from the transmitter, the delay resulting from a collision avoidance protocol implemented by the transmitter;
initiating the count sequence based on the time stamp value synchronizes the timer with a corresponding free-running timer in the transmitter;
the count sequence is based on a timer interval value explicitly encoded into the transmission signal;
the explicit encoding of the timer interval value into the transmission signal enables the receiver to implement different count sequences having different timer interval values;
the receiver is adapted to retrieve the timer interval value from the transmission signal and apply the timer interval value in the timer; and
the timer comprises a modulo n counter adapted to count by incrementing from the adjusted time stamp value to the timer interval value during the count sequence such that the duration of the count sequence corresponds to a difference between the timer interval value and the time stamp value.

24. The invention of claim 23, wherein:
the controller is adapted to control timing of energizing of the radio modem based on the timer control signal to enable the radio modem to receive a subsequent transmission signal from the transmitter, wherein the energizing of the radio modem corresponds to a transition from a doze state to an awake state; and the controller is adapted to control frequency hopping by the radio modem based on the timer control signal to adjust frequency tuning of the radio modem for receipt of the subsequent transmission signal from the transmitter, wherein the controller is adapted to implement multiple frequency hops while the radio modem is de-energized prior to receipt of the subsequent transmission signal.

25. The invention of claim 1, wherein the timer control signal is generated at the completion of the count sequence.

26. The invention of claim 1, wherein the time stamp value takes into account modem delay at the transmitter.

27. The invention of claim 1, wherein the time stamp value corresponds to a transmitter timer value after transmission from the transmitter of a header of the transmission signal has started.

28. The invention of claim 1, wherein the time stamp value accounts for delays at the transmitter due to a busy signal on a medium access protocol.

29. The invention of claim 1, wherein the time stamp value accounts for a delay between a start of a transmitter process to transmit the transmission signal and an actual time of transmitting the transmission signal from the transmitter.

30. The invention of claim 1, wherein the time stamp value represents a value within a count sequence of a timer in the transmitter.

31. The invention of claim 30, wherein the time stamp value represents the value within the count sequence of the timer in the transmitter at a time of transmission of the transmission signal from the transmitter.

32. The invention of claim 30, wherein the time stamp value is loaded into a timestamp field of the transmission signal with a value that, with regard to delays in a modem of the transmitter, is an estimate of the value within the count sequence of the timer in the transmitter at which the transmission signal will be transmitted from the transmitter.

33. The invention of claim 1, wherein step (c) comprises:
(1) adjusting the time stamp value; and
(2) initiating the count sequence beginning at the adjusted time stamp value.

34. The invention of claim 33, wherein step (c)(1) comprises adjusting the time stamp value to compensate for propagation delay at the receiver.

35. The invention of claim 33, wherein step (c)(1) comprises adjusting the time stamp value to allow for time taken to process the transmission signal at the receiver.

36. A method for a receiver in a wireless local area network (WLAN), the method comprising:
(a) receiving, from a transmitter of the WLAN, a transmission signal containing a time stamp value, wherein the time stamp value takes into account delay at the transmitter;
(b) retrieving the time stamp value from the transmission signal;
(c) initiating a count sequence based on the time stamp value;
(d) generating a timer control signal based on the count sequence; and
(e) controlling operations of the receiver based on the timer control signal.

37. The invention of claim 36, wherein step (c) comprise controlling timing of energizing of a radio modem in the receiver based on the timer control signal to enable the radio modem to receive a subsequent transmission signal from the transmitter.

38. The invention of claim 37, wherein the energizing of the radio modem corresponds to a transition from a dozen state to an awake state.

39. The invention of claim 36, wherein steps (e) comprises controlling frequency hopping by a radio modem in the receiver based on the timer control signal to adjust frequency tuning of the radio modem for receipt of a subsequent transmission signal from the transmitter.

40. The invention of claim 25, wherein the timer control signal is generated at the completion of the count sequence.

41. The invention of claim 36, wherein:
the count sequence is based on a timer interval value; and
step (c) comprises initiating the count sequence based on the time stamp value such that the duration of the count sequence corresponds to a difference between the timer interval value and the time stamp value.

42. The invention of claim 41, wherein:
the timer interval value is explicitly encoded into the transmission signal; and
step (b) further comprises retrieving the timer interval value from the transmission signal and applying the timer interval value in step (c).

43. The invention of claim 36, wherein the time stamp value corresponds to a delay in the transmission of the transmission signal from the transmitter, the delay resulting from a collision avoidance protocol implemented by the transmitter.

44. The invention of claim 36, wherein step (b) further comprises storing the time stamp value until receipt of the transmission signal is complete.

45. The invention of claim 44, wherein the storing of the time stamp value enables the receiver to receive transmissions signals having different sizes.

46. The invention of claim 44, wherein step (b) further comprises verifying whether the receiver should continue to process the transmission signal, such that the time stamp value is provided to step (c) after verifying that the receiver should continue to process the transmission signal.

47. The invention of claim 36, wherein step (c) further comprises adjusting the time stamp value by a specified offset value prior to application of the adjusted time stamp value to the count sequence.

48. The invention of claim 47, wherein the receiver applies the specified offset value to compensate for propagation delay of the receiver.

49. The invention of claim 48, wherein the receiver applies the specified offset value to compensate for propagation delay of the transmitter and the receiver.

50. The invention of claim 36, wherein initiating the count sequence based on the time stamp value synchronizes the receiver with a timer in the transmitter.

51. The invention of claim 36, wherein the timer control signal is generated at the completion of the count sequence.

52. The invention of claim 36, wherein the time stamp value takes into account delay at the transmitter.

53. The invention of claim 36, wherein the time stamp value corresponds to a transmitter timer value after transmission from the transmitter of a header of the transmission signal has started.

54. The invention of claim 36, wherein the time stamp value accounts for delays at the transmitter due to a busy signal on a medium access protocol.

55. The invention of claim 36, wherein the time stamp value accounts for a delay between a start of a transmitter process to transmit the transmission signal and an actual time of transmitting the transmission signal from the transmitter.

56. The invention of claim 36, wherein the time stamp value represents a value within a count sequence of a timer in the transmitter.

57. The invention of claim 56, wherein the time stamp value represents the value within the count sequence of the timer in the transmitter at a time of transmission of the transmission signal from the transmitter.

58. The invention of claim 56, wherein the time stamp value is loaded into a timestamp field of the transmission signal with a value that, with regard to delays in a modem of the transmitter, is an estimate of the value within the count sequence of the timer in the transmitter at which the transmission signal will be transmitted from the transmitter.

59. The invention of claim 36, wherein step (c) comprises:
(1) adjusting the time stamp value; and
(2) initiating the count sequence beginning at the adjusted time stamp value.

60. The invention of claim 59, wherein step (c)(1) comprises adjusting the time stamp value to compensate for propagation delay at the receiver.

61. The invention of claim 59, wherein step (c)(1) comprises adjusting the time stamp value to allow for time taken to process the transmission signal at the receiver.

62. A receiver for a wireless local area network (WLAN), the receiver comprising:
a radio modem adapted to receive, from a transmitter of the WLAN, a transmission signal containing a time stamp value;
a first register adapted to receive the transmission signal from which the time stamp value is retrieved;
a timer adapted to initiate a count sequence based on the time stamp value and generate a timer control signal based on the count sequence; and
a controller adapted to control operations of the receiver based on the timer control signal from the timer, wherein the controller is adapted to control frequency hopping by the radio modem based on the timer control signal to adjust frequency tuning of the radio modem for receipt of a subsequent transmission signal from the transmitter.

63. The invention of claim 62, wherein the controller is adapted to control timing of energizing of the radio modem based on the timer control signal to enable the radio modem to receive the subsequent transmission signal from the transmitter.

64. The invention of claim 63, wherein the controller is adapted to implement multiple frequency hops while the radio modem is de-energized prior to receipt of the subsequent transmission signal.

65. A receiver for a wireless local area network (WLAN), the receiver comprising:
a radio modem adapted to receive, from a transmitter of the WLAN, a transmission signal containing a time stamp value;
a first register adapted to receive the transmission signal from which the time stamp value is retrieved;
a timer adapted to initiate a count sequence based on the time stamp value and generate a timer control signal based on the count sequence; and
a controller adapted to control operations of the receiver based on the timer control signal from the timer, wherein:
the count sequence is based on a timer interval value; and
the timer is adapted to initiate the count sequence based on the time stamp value such that the duration of the count sequence corresponds to a difference between the timer interval value and the time stamp value.

66. The invention of claim 65, wherein the timer is adapted to increment a counter from the time stamp value to the timer interval value during the count sequence.

67. The invention of claim 65, wherein:
the timer interval value is explicitly encoded into the transmission signal; and
the receiver is adapted to retrieve the timer interval value from the transmission signal and apply the timer interval value in the timer.

68. The invention of claim 67, wherein the explicit encoding of the timer interval value into the transmission signal enables the receiver to implement different count sequences having different timer interval values.

69. A receiver for a wireless local area network (WLAN), the receiver comprising:
a radio modem adapted to receive, from a transmitter of the WLAN, a transmission signal containing a time stamp value;
a first register adapted to receive the transmission signal from which the time stamp value is retrieved;
a timer adapted to initiate a count sequence based on the time stamp value and generate a timer control signal based on the count sequence; and
a controller adapted to control operations of the receiver based on the timer control signal from the timer, wherein the time stamp value corresponds to a delay in the transmission of the transmission signal from the transmitter, the delay resulting from a collision avoidance protocol implemented by the transmitter.

70. A receiver for a wireless local area network (WLAN), the receiver comprising:
a radio modem adapted to receive, from a transmitter of the WLAN, a transmission signal containing a time stamp value;
a first register adapted to receive the transmission signal from which the time stamp value is retrieved;
a timer adapted to initiate a count sequence based on the time stamp value and generate a timer control signal based on the count sequence; and
a controller adapted to control operations of the receiver based on the timer control signal from the timer, wherein the receiver further comprises a second register connected between the first register and the timer and adapted to store the time stamp value until receipt of the transmission signal is complete.

71. The invention of claim 70, wherein the second register enables the receiver to receive transmissions signals having different sizes.

72. The invention of claim 70, wherein the receiver further comprises a checker adapted to verify whether the receiver should continue to process the transmission signal, such that the time stamp value is provided to the timer from the second register after the checker verifies that the receiver should continue to process the transmission signal.

73. The invention of claim 72, wherein:
a check value is explicitly coded into the transmission signal;
the receiver is adapted to retrieve the check value from the transmission signal; and
the checker is adapted to perform its verification processing based on the retrieved check value.

74. A receiver for a wireless local area network (WLAN), the receiver comprising:
a radio modem adapted to receive, from a transmitter of the WLAN, a transmission signal containing a time stamp value;
a first register adapted to receive the transmission signal from which the time stamp value is retrieved;

a timer adapted to initiate a count sequence based on the time stamp value and generate a timer control signal based on the count sequence;

a controller adapted to control operations of the receiver based on the timer control signal from the timer; and an adder adapted to adjust the time stamp value by a specified offset value prior to application of the adjusted time stamp value to the timer.

75. The invention of claim 74, wherein the receiver is adapted to apply the specified offset value to compensate for propagation delay of the receiver.

76. The invention of claim 75, wherein the receiver is adapted to apply the specified offset value to compensate for propagation delay of the transmitter and the receiver.

77. A receiver for a wireless local area network (WLAN), the receiver comprising:

a radio modem adapted to receive, from a transmitter of the WLAN, a transmission signal containing a time stamp value;

a first register adapted to receive the transmission signal from which the time stamp value is retrieved;

a timer adapted to initiate a count sequence based on the time stamp value and generate a timer control signal based on the count sequence; and a controller adapted to control operations of the receiver based on the timer control signal from the timer, wherein the time stamp value accounts for delays at the transmitter due to a busy signal on a medium access protocol.

78. A receiver for a wireless local area network (WLAN), the receiver comprising:

a radio modem adapted to receive, from a transmitter of the WLAN, a transmission signal containing a time stamp value;

a first register adapted to receive the transmission signal from which the time stamp value is retrieved;

a timer adapted to initiate a count sequence based on the time stamp value and generate a timer control signal based on the count sequence; and a controller adapted to control operations of the receiver based on the timer control signal from the timer, wherein the time stamp value accounts for a delay between a start of a transmitter process to transmit the transmission signal and an actual time of transmitting the transmission signal from the transmitter.

79. A receiver for a wireless local area network (WLAN), the receiver comprising:

a radio modem adapted to receive, from a transmitter of the WLAN, a transmission signal containing a time stamp value;

a first register adapted to receive the transmission signal from which the time stamp value is retrieved;

a timer adapted to initiate a count sequence based on the time stamp value and generate a timer control signal based on the count sequence; and a controller adapted to control operations of the receiver based on the timer control signal from the timer, wherein:

the time stamp value represents a value within a count sequence of a timer in the transmitter; and the time stamp value is loaded into a timestamp field of the transmission signal with a value that, with regard to delays in a modem of the transmitter, is an estimate of the value within the count sequence of the timer in the transmitter at which the transmission signal will be transmitted from the transmitter.

80. A receiver for a wireless local area network (WLAN), the receiver comprising:

a radio modem adapted to receive, from a transmitter of the WLAN, a transmission signal containing a time stamp value;

a first register adapted to receive the transmission signal from which the time stamp value is retrieved;

a timer adapted to initiate a count sequence based on the time stamp value and generate a timer control signal based on the count sequence; and a controller adapted to control operations of the receiver based on the timer control signal from the timer, wherein the timer is adapted to:

(1) adjust the time stamp value; and (2) initiate the count sequence beginning at the adjusted time stamp value.

81. The invention of claim 80, wherein the timer is adapted to adjust the time stamp value to compensate for propagation delay at the receiver.

82. The invention of claim 80, wherein the timer is adapted to adjust the time stamp value to allow for time taken to process the transmission signal at the receiver.

83. A method for a receiver in a wireless local area network (WLAN), the method comprising:

(a) receiving, from a transmitter of the WLAN, a transmission signal containing a time stamp value;

(b) retrieving the time stamp value from the transmission signal;

(c) initiating a count sequence based on the time stamp value;

(d) generating a timer control signal based on the count sequence; and (e) controlling operations of the receiver based on the timer control signal, wherein step (e) comprises controlling frequency hopping by a radio modem in the receiver based on the timer control signal to adjust frequency tuning of the radio modem for receipt of a subsequent transmission signal from the transmitter.

84. The invention of claim 83, wherein step (e) further comprises controlling timing of energizing of the radio modem based on the timer control signal to enable the radio modem to receive the subsequent transmission signal from the transmitter.

85. A method for a receiver in a wireless local area network (WLAN), the method comprising:

(a) receiving, from a transmitter of the WLAN, a transmission signal containing a time stamp value;

(b) retrieving the time stamp value from the transmission signal;

(c) initiating a count sequence based on the time stamp value;

(d) generating a timer control signal based on the count sequence; and (e) controlling operations of the receiver based on the timer control signal, wherein: the count sequence is based on a timer interval value; and step (c) comprises initiating the count sequence based on the time stamp value such that the duration of the count sequence corresponds to a difference between the timer interval value and the time stamp value.

86. The invention of claim 85, wherein:

the timer interval value is explicitly encoded into the transmission signal; and step (b) further comprises retrieving the timer interval value from the transmission signal and applying the timer interval value in step (c).

87. A method for a receiver in a wireless local area network (WLAN), the method comprising:
(a) receiving, from a transmitter of the WLAN, a transmission signal containing a time stamp value;
(b) retrieving the time stamp value from the transmission signal;
(c) initiating a count sequence based on the time stamp value;
(d) generating a timer control signal based on the count sequence; and
(e) controlling operations of the receiver based on the timer control signal, wherein the time stamp value corresponds to a delay in the transmission of the transmission signal from the transmitter, the delay resulting from a collision avoidance protocol implemented by the transmitter.

88. A method for a receiver in a wireless local area network (WLAN), the method comprising:
(a) receiving, from a transmitter of the WLAN, a transmission signal containing a time stamp value;
(b) retrieving the time stamp value from the transmission signal;
(c) initiating a count sequence based on the time stamp value;
(d) generating a timer control signal based on the count sequence; and
(e) controlling operations of the receiver based on the timer control signal, wherein step (b) further comprises storing the time stamp value until receipt of the transmission signal is complete.

89. The invention of claim 88, wherein the storing of the time stamp value enables the receiver to receive transmissions signals having different sizes.

90. The invention of claim 88, wherein step (b) further comprises verifying whether the receiver should continue to process the transmission signal, such that the time stamp value is provided to step (c) after verifying that the receiver should continue to process the transmission signal.

91. A method for a receiver in a wireless local area network (WLAN), the method comprising:
(a) receiving, from a transmitter of the WLAN, a transmission signal containing a time stamp value;
(b) retrieving the time stamp value from the transmission signal;
(c) initiating a count sequence based on the time stamp value;
(d) generating a timer control signal based on the count sequence; and
(e) controlling operations of the receiver based on the timer control signal, wherein step (c) further comprises adjusting the time stamp value by a specified offset value prior to application of the adjusted time stamp value to the count sequence.

92. The invention of claim 91, wherein the receiver applies the specified offset value to compensate for propagation delay of the receiver.

93. The invention of claim 92, wherein the receiver applies the specified offset value to compensate for propagation delay of the transmitter and the receiver.

94. A method for a receiver in a wireless local area network (WLAN), the method comprising:
(a) receiving, from a transmitter of the WLAN, a transmission signal containing a time stamp value;
(b) retrieving the time stamp value from the transmission signal;
(c) initiating a count sequence based on the time stamp value;
(d) generating a timer control signal based on the count sequence; and
(e) controlling operations of the receiver based on the timer control signal, wherein the time stamp value accounts for delays at the transmitter due to a busy signal on a medium access protocol.

95. A method for a receiver in a wireless local area network (WLAN), the method comprising:
(a) receiving, from a transmitter of the WLAN, a transmission signal containing a time stamp value;
(b) retrieving the time stamp value from the transmission signal;
(c) initiating a count sequence based on the time stamp value;
(d) generating a timer control signal based on the count sequence; and
(e) controlling operations of the receiver based on the timer control signal, wherein the time stamp value accounts for a delay between a start of a transmitter process to transmit the transmission signal and an actual time of transmitting the transmission signal from the transmitter.

96. A method for a receiver in a wireless local area network (WLAN), the method comprising:
(a) receiving, from a transmitter of the WLAN, a transmission signal containing a time stamp value;
(b) retrieving the time stamp value from the transmission signal;
(c) initiating a count sequence based on the time stamp value;
(d) generating a timer control signal based on the count sequence; and
(e) controlling operations of the receiver based on the timer control signal, wherein:
the time stamp value represents a value within a count sequence of a timer in the transmitter; and
the time stamp value is loaded into a timestamp field of the transmission signal with a value that, with regard to delays in a modem of the transmitter, is an estimate of the value within the count sequence of the timer in the transmitter at which the transmission signal will be transmitted from the transmitter.

97. A method for a receiver in a wireless local area network (WLAN), the method comprising:
(a) receiving, from a transmitter of the WLAN, a transmission signal containing a time stamp value;
(b) retrieving the time stamp value from the transmission signal;
(c) initiating a count sequence based on the time stamp value;
(d) generating a timer control signal based on the count sequence; and
(e) controlling operations of the receiver based on the timer control signal, wherein step (c) comprises:
(1) adjusting the time stamp value; and
(2) initiating the count sequence beginning at the adjusted time stamp value.

98. The invention of claim 97, wherein step (c)(1) comprises adjusting the time stamp value to compensate for propagation delay at the receiver.

99. The invention of claim 97, wherein step (c)(1) comprises adjusting the time stamp value to allow for time taken to process the transmission signal at the receiver.

* * * * *

UNITED STATES PATENT AND TRADEMARK OFFICE
CERTIFICATE OF CORRECTION

PATENT NO.        : 7,289,578 B2  
APPLICATION NO. : 11/331919  
DATED             : October 30, 2007  
INVENTOR(S)       : Wilhelmus J. M. Diepstraten, Hendrik van Bokhorst and Hans van Driest It is certified that error appears in the above-identified patent and that said Letters Patent is hereby corrected as shown below:

In column 12, line 2, replace "dozen" with --doze--.

Signed and Sealed this

Twenty-seventh Day of May, 2008

JON W. DUDAS  
*Director of the United States Patent and Trademark Office*